United States Patent
Carpenter et al.

(10) Patent No.: US 6,267,249 B1
(45) Date of Patent: Jul. 31, 2001

(54) TRANSPORT SYSTEM FOR AN AUTOMATIC ARTICLE GRADING APPARATUS

(75) Inventors: David Leroy Carpenter, Exeter; Jack L. Bedwell, Lindsay, both of CA (US); John Lawrence Defty-Wallace, Kings Lynn (GB)

(73) Assignee: Exeter Engineering Inc., Exeter, CA (US)

( * ) Notice: Subject to any disclaimer, the term of this patent is extended or adjusted under 35 U.S.C. 154(b) by 0 days.

(21) Appl. No.: 09/314,696

(22) Filed: May 19, 1999

(51) Int. Cl.[7] ................ B07C 5/16; B07C 5/28
(52) U.S. Cl. .......... 209/912; 209/593; 209/919; 198/370.02
(58) Field of Search ............ 198/370.01, 370.02, 198/382.1, 779; 209/651, 652, 912, 919, 592, 593

(56) References Cited

U.S. PATENT DOCUMENTS

| | | | |
|---|---|---|---|
| 5,029,692 | * 7/1991 | Warkentin | 198/370.02 |
| 5,042,637 | * 8/1991 | LaVars et al. | 209/652 X |
| 5,306,877 | * 4/1994 | Tas | 209/912 X |
| 5,477,955 | * 12/1995 | Madden et al. | 198/779 X |
| 5,626,236 | * 5/1997 | Hiebert | 198/370.02 |
| 5,626,238 | * 5/1997 | Blanc | 209/912 X |
| 5,901,854 | * 5/1999 | Ishii | 209/912 X |

\* cited by examiner

Primary Examiner—Christopher P. Ellis
Assistant Examiner—Gene O. Crawford
(74) Attorney, Agent, or Firm—Jensen & Puntigam, P.S.

(57) ABSTRACT

A roller element for a roller assembly used in an endless conveyor system for grading/sorting articles. The roller element has a faceted peripheral edge, each facet being of equal length, with approximately 12 facets per unit. Also, a quick-release roller assembly for use in a similar endless conveyor system includes a steel shaft on which roller elements are mounted. The shaft has a first opening in one end to receive a connecting pin element from a first chain and a second opening in the other end thereof which receives a connecting pin element from a second chain. Bushings are positioned in both of the shaft openings for receiving the connecting pin elements. In the one opening, a spring element is positioned between the bushing and the bottom end of the opening. The shaft has a slot in the side surface of the shaft, opening onto the first end of the shaft. A sprocket member is connected to the bushing at the one end and slidable along the shaft, bringing the bushing along, such that when the sprocket means is moved along the shaft, the bushing moves away from the connecting element therein, permitting the connecting element to be released from the shaft, so that the roller assembly can thereafter be conveniently removed from the conveyor.

1 Claim, 4 Drawing Sheets

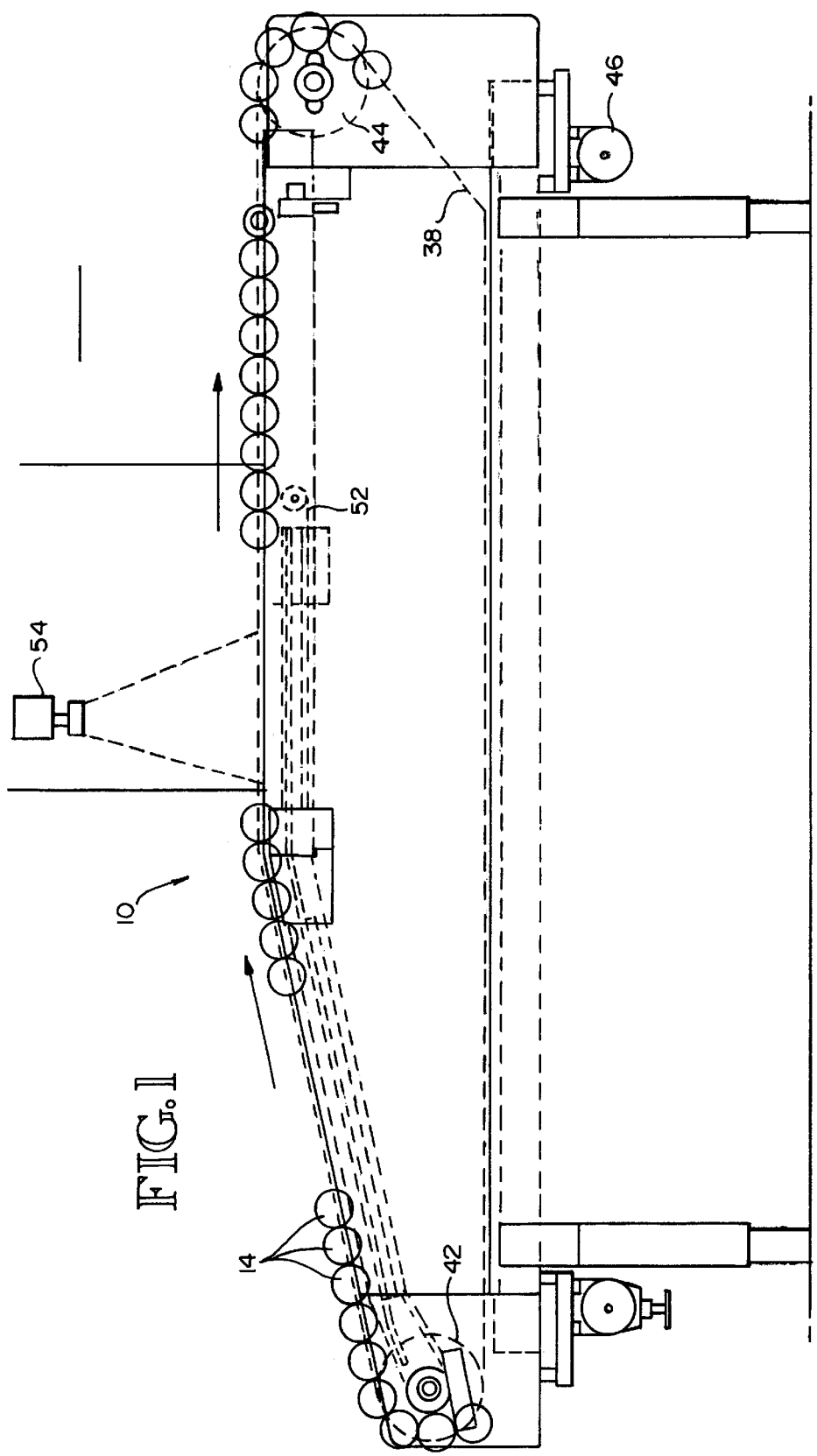

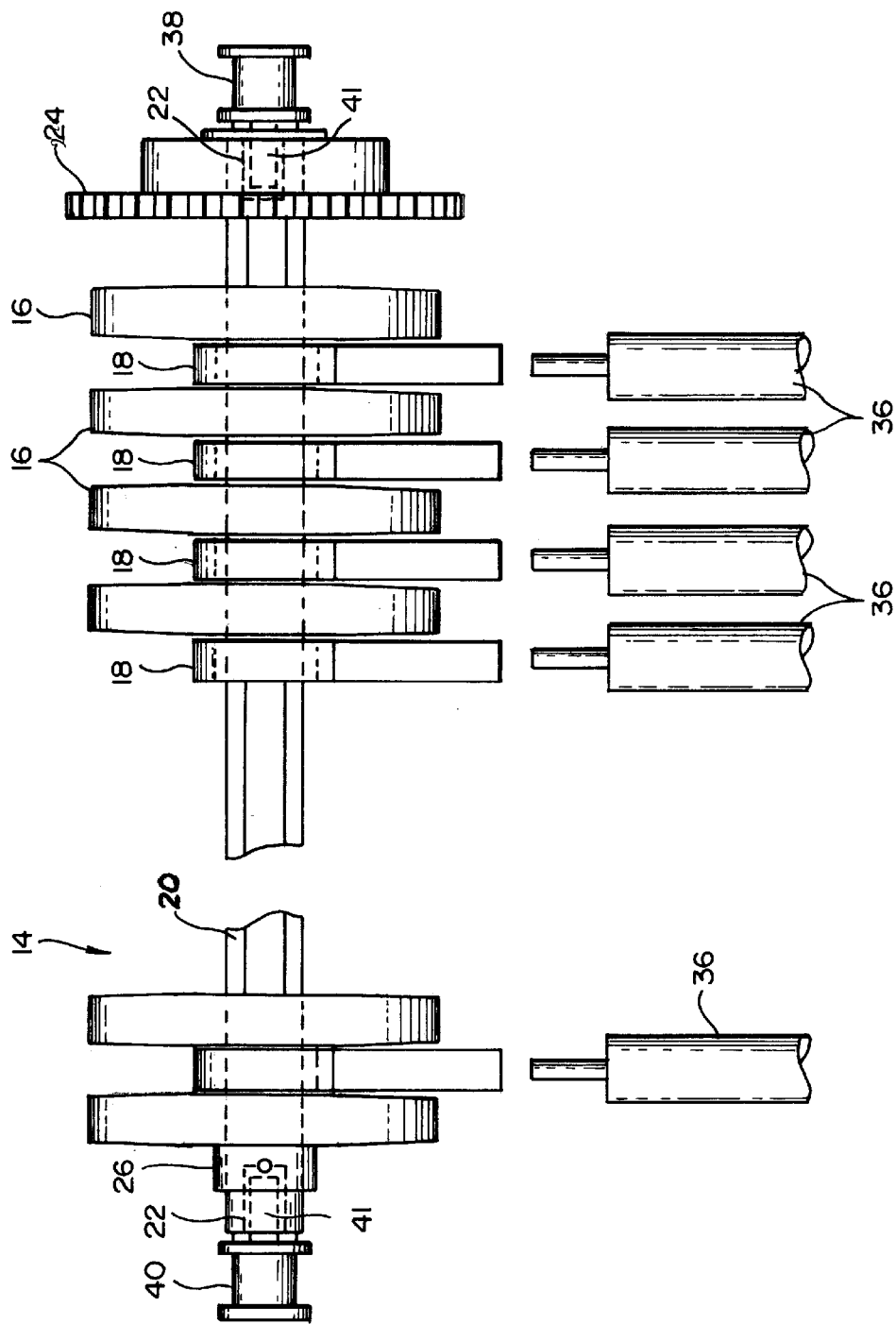

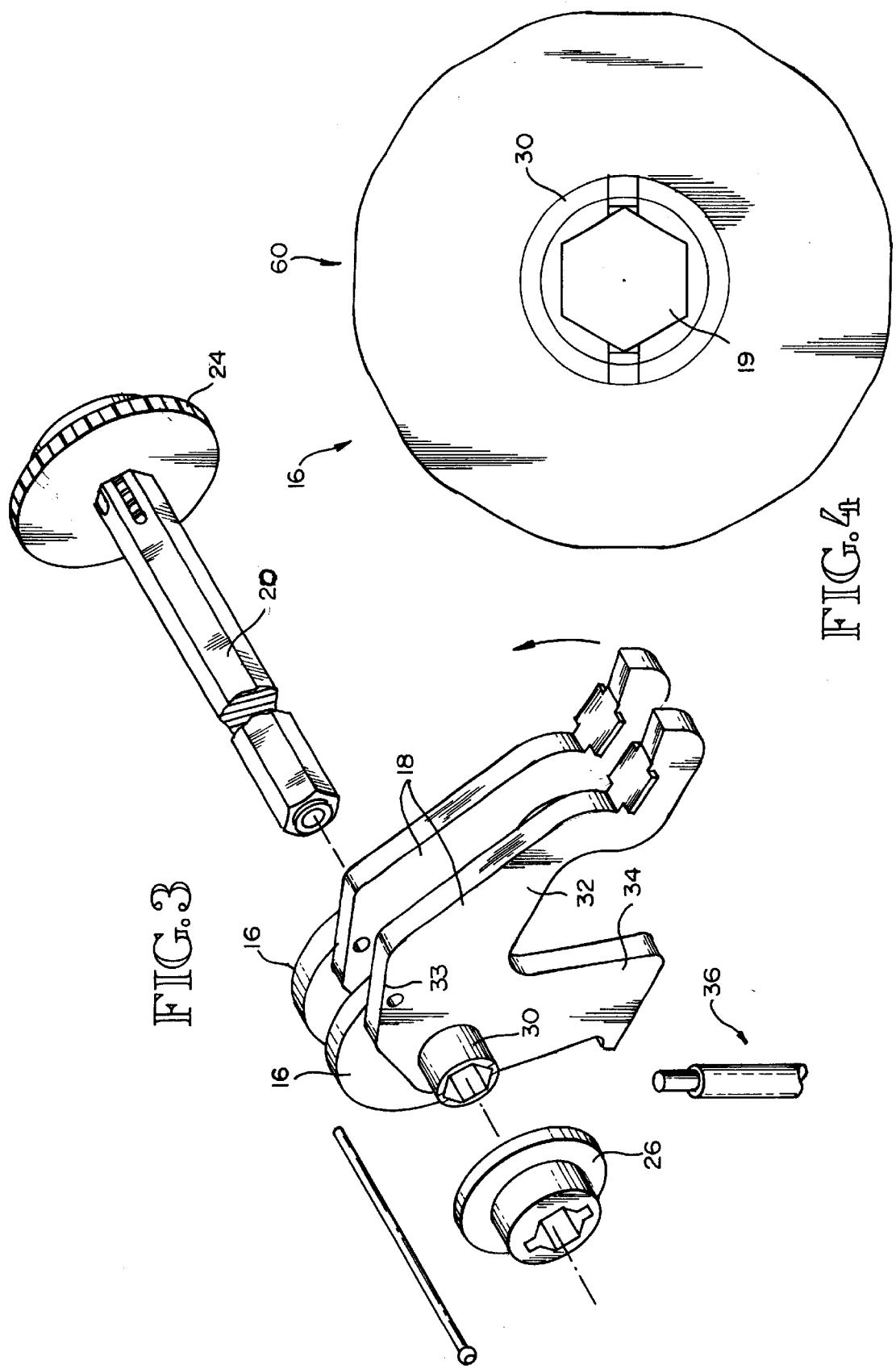

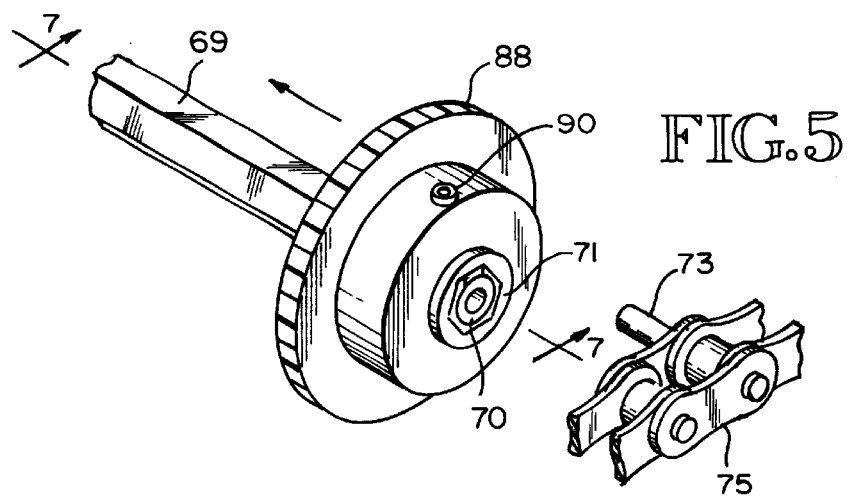
FIG. 5
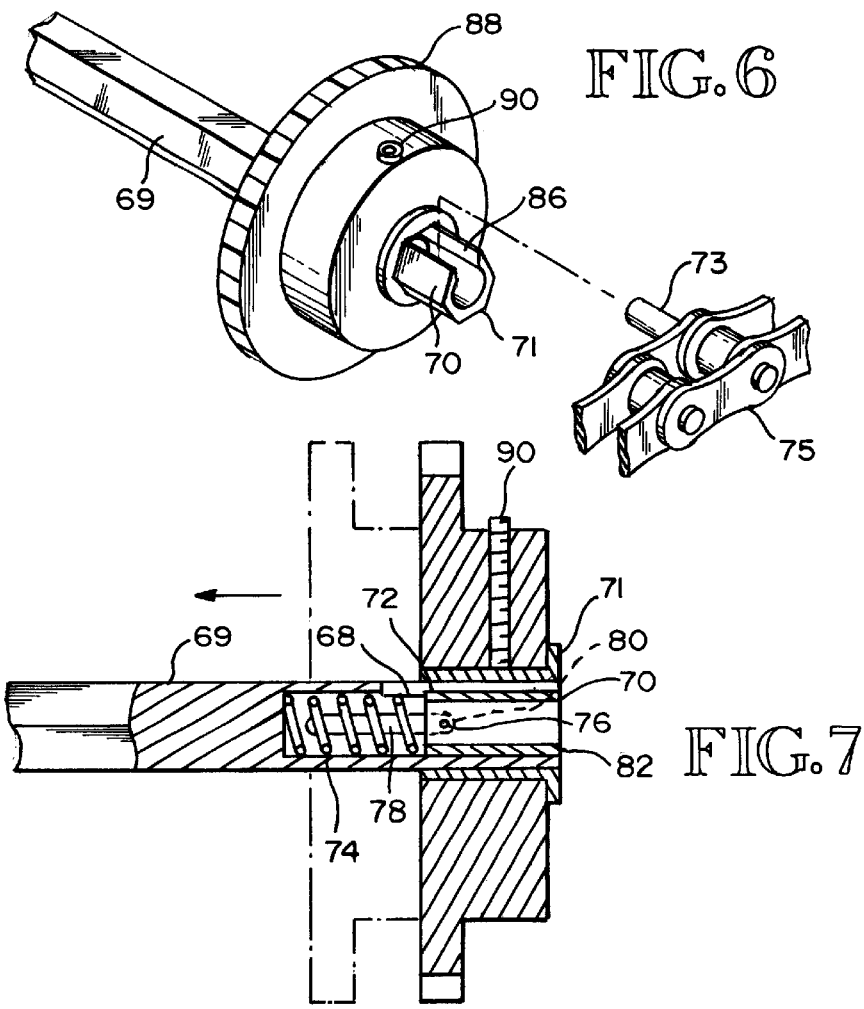
FIG. 6
FIG. 7

TRANSPORT SYSTEM FOR AN AUTOMATIC ARTICLE GRADING APPARATUS

TECHNICAL FIELD

This invention relates generally to the transport system used in an automatic grading/sorting apparatus for fruits and vegetables, and more specifically concerns a new roller element for a roller assembly portion of such an apparatus and further specifically concerns a new quick release chain pin arrangement for such an apparatus.

BACKGROUND OF THE INVENTION

Historically, fruits and vegetables have been sorted by hand in accordance with predetermined criteria which established several quality grades. The price of the fruits and vegetables would then be established in accordance with such grades. Such a hand sorting process, however, is labor-intensive and hence costly.

Mechanical/optical systems have been developed to provide an automatic grading/sorting capability for fruits and vegetables, based on information provided by a sensing part of the automatic system. Gradually, such systems have become more sophisticated and accurate. In one such system, a conveyor carries the articles to be sorted through a viewing station at which a camera is mounted, typically above the conveyor, in such a manner that the articles are scanned as they pass beneath the camera.

The conveyor comprises a series of roller assemblies which are connected together with a drive chain, but are also individually driven so that they rotate as the conveyor moves longitudinally. This results in the articles on the conveyor moving and rotating, which moves the articles into the valleys formed by the roller assemblies and aligns them on their horizontal axes as they are being scanned by the camera, providing a complete view of the passing articles.

The image produced by the camera is then directed to a central processing unit which analyzes the images of the individual articles in accordance with selected criteria, including size (i.e. length), diameter, volume, appearance and imperfections (rot, cracks and damage). The resulting process data about the articles is then compared against pre-selected standards, and the articles are sorted (or discarded) accordingly. Such a system is disclosed in a co-pending U.S. patent application titled: "Apparatus and Method for Grading Articles", assigned to the same assignee as the present invention. The present invention is directed toward improvements in such previous systems.

SUMMARY OF THE INVENTION

One aspect of the present invention concerns an improvement in a conveyor system for articles, including fruits and vegetables, the conveyor system comprising a series of roller assemblies, wherein the conveyor system is driven so that the roller assemblies progress longitudinally of the conveyor, each roller assembly comprising a mounting shaft and a plurality of roller elements, the improvement being in the roller elements and comprising: a roller element having a faceted peripheral edge, the number of facets being in the range of eight to fourteen.

Another aspect of the invention is directed toward a conveyor system which includes a plurality of successive roller assemblies which are driven by a chain having connecting pins which extend therefrom for connection to one end of each of the roller assemblies, wherein the roller assembly comprises: a shaft on which roller elements for the conveyor are mounted, the shaft having a first opening in one end thereof to receive a connecting pin element from a first chain assembly which connects all the roller assemblies in the conveyor, wherein the first opening extends longitudinally inward of the shaft; bushing means positioned in the first shaft opening for receiving a connecting pin element for the drive chain; a spring element positioned between the bottom end of the first shaft opening and the bushing positioned therein, such that upon application of pressure on the bushing, the bushing moves inwardly of the shaft toward a bottom end of the opening; a slot in the shaft extending longitudinally thereof from the one end; and means mounted to the bushing and slidable along the shaft, such that when such slidable means is moved along the shaft, the bushing moves away from the connecting pin element therein, permitting the connecting pin element to be released from the shaft through said slot, so that the roller assembly may be conveniently removed from the chain, and the roller assembly can be conveniently removed from the conveyor apparatus.

BRIEF DESCRIPTION OF THE DRAWINGS

FIG. 1 is a side elevational view of a transport system for automatic grading/sorting of fruits and vegetables.

FIG. 2 is an elevational view of one of the roller assemblies used in the conveyor system of FIG. 1.

FIG. 3 is a perspective view of a portion of the roller assembly of FIG. 2.

FIG. 4 is an elevational view of one of the roller elements used in the roller assembly of FIG. 2.

FIG. 5 is a perspective view showing the connection between the chain drive of the conveyor and a roller assembly.

FIG. 6 is a perspective view showing the position of a portion of the roller assembly permitting disconnection of the chain drive.

FIG. 7 is a cross-sectional view of a portion of the disconnect assembly portion of the roller assembly of FIGS. 5 and 6.

BEST MODE FOR CARRYING OUT THE INVENTION

FIG. 1 shows a basic conveyor system for inspecting and grading/sorting articles, such as fruits and vegetables, which incorporates the present inventions. The general arrangement of such a system is as follows. The system shown generally at 10 includes a conveyor 12, which comprises a successive plurality of roller assemblies 14 linked together at their opposing ends in an endless conveyor arrangement. Referring to FIG. 2, each roller assembly comprises an alternating plurality of roller elements 16 and flip lever elements 18 mounted on a central steel shaft 20. Steel shaft 20 has bushings 22—22 at each end thereof and a sprocket 24 in the vicinity of one end thereof. At the other end is a keeper ring (not shown). Roller elements 16 and flip lever elements 18 alternate along shaft 20 from sprocket 24 to an end cap 26 at the other end of the shaft. It should be understood that the above-described arrangement of roller elements and flip element is for illustration; other roller assembly arrangements using the roller element configuration of the present invention are certainly possible.

In the embodiment shown, roller elements 16 are generally disk-shaped members with a central opening 19 having a configuration which permits them to be received on the central shaft 22. In the embodiment shown, shaft 22 is hexagonal, although it could be any other suitable shape. The central opening 19 of each roller element is of similar configuration so that the roller element, when mounted on the shaft 22, will turn without slipping as shaft 22 is turned.

Extending outwardly from one side of each roller element about central opening 19 is a round hub portion 30. The flip lever elements 18 also have a round central opening with a diameter which permits the flip element to be mounted on the hub portion 30 of an adjacent roller element. The flip lever element 18 is thus free to rotate on the hub portion 30 of its associated adjacent roller element. Flip lever elements 18—18 include an arm portion 32 which, when the flip lever elements are mounted on shaft 20, extends forwardly of the conveyor, generally horizontally below the upper edge of the roller elements 16 and such that an upper edge 33 of arm portion 32 is just below the articles to be conveyed, which lie in the "valleys" between the roller elements of successive roller assemblies 14—14. The edges of the arm portion can be slightly relieved. The roller elements support the articles. In some cases, smaller size articles may lie partially directly on top of the upper edges 33 of the arm portions of the flip lever elements.

A leg portion 34 of each flip lever element extends directly downward, past the bottom of the roller elements 16. Positioned below the leg portion of each flip element is an actuating means 36 which moves between two positions. In a first position, the top of the actuating member is below the lower end of leg portion 33 of the flip elements, i.e. the conveyor is free to move without any contact between the flip levers and the actuating elements. In a second position, a portion of the actuating member is moved upwardly so as to contact the leg portion of the next flip lever in the column of flip levers defined by successive roller assemblies. Such contact will result in the flip lever rotating forwardly (clockwise when viewed from the sprocket end and counterclockwise in FIG. 3), as the conveyor as a whole continues to move, flipping the fruit above the arm portion of the flip lever up and off the surface of the conveyor.

Referring again to FIGS. 1 and 2, the individual roller assemblies 14—14 are connected together by continuous pin chains 38 and 40 located on opposing sides of the conveyor. Extending from the sides of a conventional chain are successive pin connectors 41, each of the pin connectors being steel cylinders (pins) approximately ¾ inch long and ¼ inch in diameter. The pin connectors 41 are inserted into the bushings 22—22 of the successive roller assemblies, on both sides of the conveyor. The pin chains with the pin connectors thus connect the plurality of roller assemblies into a continuous (endless) conveyor system. Chain 38 is shown in FIG. 1.

At the beginning and end points of the conveyor, the pin chain 38 passes around input and discharge end sprockets 42 and 44. Opposing chain 40 passes around similar end sprockets on the other side of the conveyor. The two end sprockets on the input and discharge end, respectively, of the conveyor are on a common shaft. Discharge end sprocket 44 is driven by an electric motor 46. When the sprocket 44 is being driven, the entire conveyor moves longitudinally with an endless procession of roller assemblies.

As indicated above, each shaft has a sprocket 24 at one end thereof. Extending around sprocket 24 is a roller assembly chain 52. Roller assembly chain 52 extends from the infeed end of the conveyor to a point just past a camera 54 which is positioned above the conveyor, approximately midway of an upper run of the conveyor, for viewing the articles as they pass by the camera. The actuation of the roller assembly chain 52 rotates the shafts of the individual roller assemblies and hence the roller elements positioned thereon. Because the flip lever elements 18 are mounted for rotation on the hub portions of the adjacent elements, rotation of the roller elements will not rotate the flip lever elements, i.e. the flip lever elements remain in position.

In operation, pin chains 38, 40 move the conveyor 10 past the camera assembly, while rotation of the roller assembly chain 52 rotates the individual roller assemblies, resulting in the fruits and vegetables turning and reorienting thereon. As the articles of produce pass beneath camera 54, the camera will capture various images of each article, which images will then be analyzed by a processing means against pre-established standards. When the image characteristics of a particular article on the conveyor do not satisfactorily meet the pre-established standards, the flip levers located beneath that article are actuated by their associated actuating means 36 and the article is flipped upwardly and forwardly, landing on a cross-conveyor, which removes the fruit from the conveyor 12. With a number of cross-conveyors in the system, a complete grading/sorting function can be accomplished, in addition to elimination of unsatisfactory produce.

One aspect of the present invention is the roller element 16. This is shown with particularity in FIG. 4. As indicated above, conventional roller elements 16 are round at the perimeter thereof. With the round configuration, however, it has been found that there is usually some side-to-side movement of the articles on the conveyor during the conveying process. This is undesirable, as it is important in imaging systems that the article maintain a consistent side-to-side (lateral) position on the conveyor, i.e. even though the article may tumble, it should not change its basic position on the conveyor. This is particularly important downstream of the camera, after the point where rotation of the roller assemblies stops. At that point, the processor must know the actual position of the articles, so that correct sorting (or discard) of the articles can occur by initiation of the appropriate actuator means.

In the present invention, roller element 16 has a faceted peripheral edge 60. Edge 60 typically has facets of equal length, with the number of facets typically within the range of 8–14. This roller configuration has been found to assist in maintaining the position of the article on the conveyor, particularly relative to side-to-side movement as the conveyor moves forward, including from the point beyond which the roller assemblies are no longer being rotated. The facets help rotate the article. In addition, roller elements with different diameters, e.g. the roller elements alternate between two lengths in a roller assembly, will create small "pockets" across the conveyor, so that small articles are in effect captured and thus do not migrate laterally.

In one particular embodiment, there are twelve equal facets on the peripheral edge of the roller element. The actual diameter of the roller elements, i.e. the distance between opposing facets, in a particular machine will vary depending upon the product being processed.

Generally, it is desirable that the facets be fairly smooth, with the joining portions of the facets being rounded to provide a relatively smooth transition between successive adjacent facets. It is also possible, however, that the faceted surfaces be roughened or "knurled" to achieve particular desired effects.

The peripheral edge 60 also has a shallow groove therein. Fitted into the groove is a rubber O-ring which extends slightly above the surface of the peripheral edge 60. This gives a cushioning effect to the articles on the conveyor.

The other aspect of the present invention, shown FIGS. 5–7, is a quick-release pin assembly, meaning a quick release of pin chain 38, and in particular the protruding connecting pins, from the individual roller assemblies. The purpose of this invention is to quickly and conveniently disconnect the pin chains from one or more defective roller assemblies, remove and replace the defective assemblies, and then reconnect the pin chains, without having to disassemble the entire conveyor/pin chain arrangement.

In conventional conveying systems using roller assemblies, when a particular roller element(s) on a given roller assembly needs to be replaced or repaired, the entire conveyor must not only be shut down, but the chain must also be removed prior to removing the roller assembly. This is a long process and is expensive because of the downtime of the conveyor.

In this invention, there is an opening 68 in shaft 69 at the sprocket end 71 thereof, from the outboard end inwardly of the shaft, to receive a bushing 70. Opening 68 is deeper than is necessary to accommodate the bushing. In the embodiment shown, it is approximately 3 inches deep, more than twice the length of the bushing and more than twice the length of the pin connector 73 from pin chain 75.

Positioned between the inboard end 72 of bushing 70 and the bottom of the opening 68 is a spring 74, which biases the bushing toward the sprocket end 71 of the shaft. Extending through the bushing and outwardly from the side cylindrical surface of bushing 70 is a small diameter pin 76, which fits in a narrow slot 78 in shaft 69. Slot 78 in the embodiment shown is approximately one inch long and extends in depth from the exterior surface of the shaft 69 to interior opening 68. Spring 74 biases bushing 70 such that slot pin 76 is positioned against outboard end 80 of slot 78. In this position, outboard end 82 of bushing 70 is approximately coincident with the end 71 of shaft 69. Bushing 70 can be pushed inwardly of the shaft against the bias of spring 74, with pin 76 moving in slot 78 away from the outboard end 80 thereof.

Shaft 69 includes another slot 86 which extends from the sprocket end 71 inwardly along the shaft 69. Slot 86 in the embodiment shown is approximately 1¼ inches long (longer than pin 73) and ¼-inch wide, encompassing bushing 70 and a portion of spring 74. Each complete roller assembly, as indicated above, includes a sprocket 88 which fits on shaft 69 at the sprocket end 71 thereof. A screw 90 extends through sprocket 88, through slot 86, and is threaded into a threaded opening in bushing 70. Sprocket 88 is mounted on shaft 69 such that the sprocket can move along the length of shaft 69, but not rotationally. When pressure is applied in an inboard direction against the sprocket, forcing it along the shaft, as shown by the arrow in FIGS. 5 and 7, the bushing 70 moves as well, against the action of spring 74. The bushing thus moves inwardly along the shaft, away from pin connector 73, leaving pin 73 exposed. The exposed pin connector 73 can now be moved out of the shaft through slot 86.

When a particular roller assembly in the conveyor needs to be replaced, it is thus only necessary for an operator to push the sprocket of the particular roller assembly which is to be removed inwardly along the shaft, which will result in the bushing to which the sprocket is connected also moving inwardly along the shaft within opening 68. The sprocket is moved sufficiently that the connecting pin 73 from the pin chain is freed from the bushing. The pin is then removed from the shaft through slot 86, thereby disconnecting the one roller assembly from the one pin chain adjacent the sprocket. The roller assembly is then pulled away from the other pin chain. A new roller assembly is then inserted into the conveyor, using the above steps in reverse order. When the sprocket is released, the conveyor is again ready for use. This arrangement saves considerable time and expense in repairing roller assembly conveyors.

Referring to FIG. 3, a rod 90 is inserted through openings 92 in the flip lever elements to maintain them in alignment when a new roller assembly is inserted into the conveyor.

Although preferred embodiments of the inventions have been disclosed for illustration, it should be understood that various changes, modifications and substitutions may be incorporated in such embodiments without departing from the spirit of the inventions which are defined by the claims which follow.

What is claimed is:

1. In a conveyor system for fruits and vegetables, which comprises a series of successive roller assemblies, wherein the conveyor system is driven so that the roller assemblies progress longitudinally of the conveyor, each roller assembly comprising a mounting shaft and a plurality of roller elements and flip lever elements arranged therealong, wherein the roller elements are mounted so as to not be rotatable relative to the shaft but wherein the flip lever elements do rotate relative to the shaft, an improvement in the flip lever elements, comprising:

an opening through each of the flip lever elements for receiving a rod therethrough, such that when all of the flip lever elements are in registry along the roller assembly, the openings therethrough are also in registry, and the rod maintains the flip lever elements in registry during replacement of a roller assembly.

* * * * *